United States Patent

[11] 3,622,394

| [72] | Inventors | Mohendra S. Bawa;<br>Henry R. Kroeger; James K. Truitt, all of Dallas, Tex. |
|---|---|---|
| [21] | Appl. No. | 596,449 |
| [22] | Filed | Nov. 23, 1966 |
| [45] | Patented | Nov. 23, 1971 |
| [73] | Assignee | Texas Instruments Incorporated<br>Dallas, Tex. |

[54] AN ELECTROLYTE-MATRIX MATERIAL FOR USE IN MOLTEN CARBONATE FUEL CELLS
4 Claims, No Drawings

[52] U.S. Cl. .................................................. 136/153
[51] Int. Cl. ..................................................... H01m 9/00
[50] Field of Search........................................... 136/86,
153; 23/52; 106/46, 55, 65

[56] References Cited
UNITED STATES PATENTS

| 2,276,188 | 3/1942 | Greger ........................ | 136/86 |
| 3,257,239 | 6/1966 | Shultz et al. ................. | 136/86 |
| 3,351,491 | 11/1967 | Harris et al. ................. | 136/86 |

*Primary Examiner*—Donald L. Walton
*Attorneys*—Samuel M. Mims, Jr., James O. Dixon, Andrew M. Hassell, Gerald B. Epstein and John E. Vandigriff

ABSTRACT: This invention relates to fuel cells. More particularly it relates to an electrolyte-matrix material and the process of making the same for use in high-temperature molten carbonate fuel cells.

AN ELECTROLYTE-MATRIX MATERIAL FOR USE IN MOLTEN CARBONATE FUEL CELLS

A high-temperature fuel cell requires a porous support medium for the electrolyte separating the anode and the cathode. One of the first approaches has been the use of a porous disc of magnesium oxide (MgO) permeated with an appropriate electrolyte, such as sodium-lithium carbonate. Magnesium oxide is essentially nonreactive and therefore does not enter into the chemical reactions incident to fuel cell operation. Disc fuel cells are relatively bulky and heavy, having for example an electrolyte-matrix thickness (electrolyte and support medium) of about 0.125 inch and a weight of about 18 p.s.f. of electrode area. Fuel cell size has been reduced somewhat by incorporating powdered magnesium oxide in the electrolyte instead of using magnesium oxide disc, with the result that electrolyte-matrix thickness and fuel cell weight has been reduced thereby to 0.075 inch and 6 p.s.f., respectively. There is a certain amount of nonuniformity with respect to the dispersion of the electrolyte in supporting medium regardless of whether the supporting medium is in disc or powdered form; but considering the size and thickness of the resulting electrolyte-matrix, the efficiency of the cell is not appreciably affected by the nonuniformity.

However, nonuniformity of the electrolyte-matrix is an important factor in the design of very thin fuel cells, that is, cells that have, for example, a matrix thickness in the range of 0.005 to 0.010 inch and weight as little as 1.5 p.s.f. of electrode area. In very thin fuel cells, the nonuniformity of electrolyte dispersion and the relatively large particle size of the support medium, such as powdered magnesium oxide, cause regions of the matrix to be practically nonsupported, thus resulting in gas blowout and leakage. In addition to the problems of blowout and leakage, very thin fuel cells, along with the thicker fuel cells, lose efficiency due to corrosion of the electrodes by the high temperatures involved and the corrosive nature of the sodium-lithium carbonate electrolyte, thereby reducing the effective life of the cell. Another problem with conventional molten carbonate electrolyte fuel cells having powdered magnesium oxide as the support medium is the time necessary to activate the cell; that is, the time it takes the cell to reach its maximum power output after the cell reaches its operating temperature, such time being in the range from about 24 to about 100 hours.

With these difficulties in mind, it is an object of this invention to provide a method of forming a very homogenous electrolyte-matrix for molten carbonate fuel cells, said electrolyte-matrix being composed of different particle sizes, some being in the colloidal particle size range, thereby furnishing a porous and tightly packed support medium for the carbonate electrolyte.

Another object of the invention is an electrolyte-matrix for molten carbonate fuel cells that inhibits electrode corrosion.

Still another object of the invention is a homogenous electrolyte-matrix originally in the fluid state, which can be painted or sprayed on the surface of the electrodes, thereby making it possible to fabricate very thin fuel cells.

The novel features believed to be characteristic of this invention are set forth with particularity in the appended claims. The invention itself, however, as well as further objects and advantages thereof, may best be understood by reference to the following detailed description.

The invention involves the reaction between sodium aluminate ($NaAlO_2$) and lithium carbonate ($Li_2CO_3$) suspended in water, according to the following equation:

$$2NaAlO_2 + 2Li_2CO_3 \rightarrow 2LiAlO_2 + Na_2CO_3 + Li_2CO_3$$

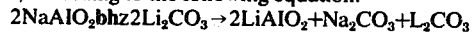

Powdered sodium aluminate is suspended in water in the ratio of approximately one part powder to two parts water by weight. Powdered lithium carbonate is also suspended in water in the ratio of approximately 0.9 part powder to two parts water by weight. Both suspensions are then mixed together with all of the sodium aluminate reacting with a portion of the lithium carbonate, thereby leaving in suspension on unreacted portion of the lithium carbonate. Following the decompositions according to the above equation, there remains, in addition to the lithium aluminate ($LiAlO_2$), sodium carbonate ($Na_2CO_3$) and the unreacted lithium carbonate ($Li_2CO_3$) in equimolal quantities. Due to the previously described reaction, the suspension contains $LiAlO_2$ of colloidal particle size. The suspension can now be stored without settling for several weeks.

When the suspension is ready to be used in a fuel cell, an amount of support material such as magnesium oxide (MgO), or magnesium aluminate ($MgAl_2O_4$), or aluminum oxide ($Al_2O_3$), or lithium aluminate ($LiAlO_2$) (all of which materials are available commercially in dry powdered form) about equal to the weight of the suspension is added to the suspension and thoroughly blended (six parts of support material added to one part of sodium aluminate, 0.9 part of lithium carbonate, and four parts of water). After mixing the electrolyte-matrix material containing lithium aluminate, sodium carbonate, lithium carbonate and the later added support medium, the mixture is applied to the electrodes by any convenient method, such as by spraying or by use of a spatula, and allowed to dry. The electrodes with the applied electrolyte-matrix may be placed in contact with each other to form the fuel cell. However, if the electrolyte matrix on each of the electrodes does not contain the required quantity of electrolyte, additional sodium-lithium carbonate may be added.

By way of example, an electrolyte-matrix was prepared by suspending 41 grams of sodium aluminate and 37 grams of lithium carbonate in separate containers, each holding 75 cubic centimeters of water. The suspensions were mixed together and thoroughly blended. An equal weight (about 227 grams) of magnesium oxide was added to the mixed suspension and the suspension again thoroughly blended. Following the blending, a thin uniform void-free layer of the completed electrolyte-matrix material was applied to the electrodes with a spatula, making sure that the coating completely covered the sides of the electrodes that were opposite the sides facing the fuel and oxidant supplies. The film dried to a strong adherent coating without cracking. The dried film had the approximate composition of:

| | |
|---|---|
| $LiAlO_2$ | 10–15% by weight |
| $NaLiCO_3$ (equimolal quantities of $Na_2CO_3$ and $Li_2CO_3$) | 10–15% by weight |
| MgO | 80–70% by weight |

The film (0.005 to 0.010 inch in thickness) was porous enough so that when more electrolyte was added, the electrolyte-matrix held about double the weight of electrolyte originally contained in the above mixture without losing its support characteristics.

A fuel cell containing an electrolyte-matrix as prepared by the method of this invention using fuel containing 28 percent hydrogen ($H_2$) was operated at 700° C. After 1.2 hours at 700° C. the fuel cell produced 11.9 watts/ft.$^2$ of electrode area at 0.6 volt and 17.7 watts/ft.$^2$ at 0.6 volt after 25.2 hours of operation. The activation time of 1.2 hours of this fuel cell is considerably less than the activation time of a molten carbonate fuel cell using a conventional magnesium-sodium lithium carbonate electrolyte-matrix, such activation time usually requiring from about 24 to 100 hours.

The lithium aluminate which acts as a support medium for the electrolyte along with the magnesium oxide is in colloidal form. By being in the colloidal particle size range, the lithium aluminate particles are uniformly distributed among the larger magnesium oxide particles, thereby filling voids and preventing gas leakage usually due to the nonuniformity and density of packing of the electrolyte-matrix. The reaction product, lithium aluminate, also inhibits corrosion of the electrodes.

As previously stated, one of the advantages of the invention is the reduction in activation time of a fuel cell fabricated according to the invention. Instead of waiting from 20 to 100 hours for the fuel cell to operate at optimum power after reaching its operating temperature, as with a conventional magnesium oxide supported electrolyte-matrix, the fuel cell will activate in less than 2 hours. Also as previously stated, another advantage of a fuel cell produced according to the invention is an appreciable reduction in size.

While the invention has been described with reference to a specific method and a preferred embodiment, it is to be understood that this description is not to be construed in a limiting sense. Various modifications of the disclosed method, as well as other embodiments of the invention, will become apparent to persons skilled in the art without departing from the spirit and scope of the invention as defined by the appended claims.

What is claimed is:

1. An electrolyte-matrix material for use in molten carbonate fuel cells consisting essentially of about 10 percent to about 15 percent by dry weight of colloidal lithium aluminate, about 10 percent to about 15 percent by dry weight of sodium lithium carbonate, and the remainder consisting of a support medium selected from the group consisting of magnesium oxide, magnesium aluminate, and lithium aluminate.

2. The electrolyte-matrix material as defined in claim 1 wherein said support medium is magnesium oxide (MgO).

3. The electrolyte-matrix material as defined in claim 1 wherein said support medium is magnesium aluminate ($MgAl_2O_4$).

4. The electrolyte-matrix material as defined in claim 1 wherein said support medium is lithium aluminate $LiAlO_2$.

* * * * *